(12) United States Patent
Gossett et al.

(10) Patent No.: US 9,423,504 B1
(45) Date of Patent: Aug. 23, 2016

(54) ARROW HEAD TRACKING DEVICE

(71) Applicants: Tim Gossett, St. Charles, MO (US);
Robert Remmert, St. Charles, MO (US)

(72) Inventors: Tim Gossett, St. Charles, MO (US);
Robert Remmert, St. Charles, MO (US)

( * ) Notice: Subject to any disclaimer, the term of this patent is extended or adjusted under 35 U.S.C. 154(b) by 0 days.

(21) Appl. No.: 14/813,789

(22) Filed: Jul. 30, 2015

Related U.S. Application Data

(60) Provisional application No. 62/032,128, filed on Aug. 1, 2014.

(51) Int. Cl.
| | |
|---|---|
| *F42B 6/04* | (2006.01) |
| *G01S 19/19* | (2010.01) |
| *G01S 19/24* | (2010.01) |
| *F42B 6/08* | (2006.01) |
| *F42B 12/38* | (2006.01) |

(52) U.S. Cl.
CPC . *G01S 19/19* (2013.01); *F42B 6/04* (2013.01); *F42B 6/08* (2013.01); *F42B 12/385* (2013.01); *G01S 19/24* (2013.01)

(58) Field of Classification Search
CPC ............. F42B 6/04; F42B 6/08; F42B 12/385
See application file for complete search history.

(56) References Cited

U.S. PATENT DOCUMENTS

| | | | |
|---|---|---|---|
| 4,675,683 A * | 6/1987 | Robinson | F42B 6/04 342/386 |
| 4,940,245 A | 7/1990 | Bittle, Jr. | |
| 5,157,405 A | 10/1992 | Wycoff et al. | |
| 5,446,467 A | 8/1995 | Willett | |
| 6,409,617 B1 | 6/2002 | Armold | |
| 6,612,947 B2 | 9/2003 | Porter | |
| 7,632,199 B2 | 12/2009 | Kikos | |
| 8,088,028 B2 * | 1/2012 | Jones | F42B 12/385 473/578 |
| 8,128,520 B2 | 3/2012 | Miner | |
| 8,221,273 B2 | 7/2012 | Donahoe | |
| 8,446,282 B1 * | 5/2013 | Warner | A01M 31/002 340/573.1 |
| 9,062,947 B1 * | 6/2015 | Patel | F42B 6/04 |
| 2011/0304505 A1 | 12/2011 | Parker et al. | |
| 2012/0220399 A1 | 8/2012 | Ferguson | |

* cited by examiner

*Primary Examiner* — John Ricci
(74) *Attorney, Agent, or Firm* — Robert C. Montgomery; Montgomery Patent & Design

(57) ABSTRACT

A tracking device configured to hold a GPS tracking apparatus and a battery is adapted to engage an arrow shaft at the junction of the arrow shaft and an arrow head. In use, GPS data is displayed upon a personal electronic device to enable tracking stricken game.

12 Claims, 3 Drawing Sheets

ARROW HEAD TRACKING DEVICE

RELATED APPLICATIONS

The present invention was first described in and claims the benefit of U.S. Provisional Application No. 62/032,128 filed Aug. 1, 2014, the entire disclosures of which are incorporated herein by reference.

FIELD OF THE INVENTION

The present invention relates generally to a tracking device configured to hold a GPS tracking apparatus and a power source and be adapted to engage an arrow bolt at the junction of the arrow bolt and arrow head.

BACKGROUND OF THE INVENTION

When a hunter strikes his game, he or she is often faced with subsequent tracking of the animal for some game can live for several hours after being hit. The likelihood of game continuing to live and remain mobile often depends upon the accuracy of the hunter's shot. In instances when game is not immediately immobilized, several things could happen. The game could run so far and so fast that the hunter never catches up to it or the wounded animal could be attacked by other wild animals, ruining the trophy and/or meat.

In fact, instances have been known to occur where other hunters come upon the wounded game, and simply claim it as their own. The occurrence of these situations is quite frequent when dealing with bow or cross-bow hunting situations. The difficulty experienced in producing an accurate shot with these devices increases the likelihood that it will not produce an instant kill, thus making necessary the aforementioned tracking of the injured but nevertheless mobile game. Furthermore, these problems are compounded in a situation where the hunter is hunting at dusk, dawn, or in cloudy/foggy situations where visibility is limited. Additionally, as arrows are becoming increasingly expensive, loss of an arrow can become an annoying and costly proposition. As a result, whether tracking a stricken game or looking for a lost arrow, the use of the tracking device ensures that the hunter can quickly locate it thereby minimizing any risk of loss.

SUMMARY OF THE INVENTION

The inventor has recognized the aforementioned inherent problems and lack in the art and observed that there is a need for an arrow head tracking device.

It is therefore an object of the invention to provide a tracking device including a housing, an aperture, a battery disposed within a compartment within the housing, a circuit disposed within the housing, a first locking feature disposed within the housing and an access lid. The battery is in electrical communication with the circuit. The housing is configured to be removably attached, via the aperture, between an arrow bolt and an arrow head. The housing also has an access lid further comprising a second locking feature. The second locking feature is disposed on underside of the access lid and matingly interacts with the first locking feature thereby removably attaching the access lid to the housing.

It is another object of the invention to fashion the housing in a generally "c"-shaped configuration, having barbed points located at distal ends of a pair of horizontal extensions. The aperture is located at a center point of a vertical portion linking the pair of horizontal members.

The circuit comprises a GPS receiver configured to receive a first signal. The circuit also comprises a cellular transmitter which is configured to transmit a second signal to a personal electronic device when said circuit receives said first signal. The second signal comprises GPS and map coordinate information regarding location of the device. The housing further comprises a power switch in electrical communication with the circuit and the battery. The device may also be configured to only be activated by insertion of the battery and only deactivated by removal of the battery.

The tracking device may also comprise an arrow head, further comprising a plurality of blades, a ferrule, a tip and a threaded adapter, a housing, an aperture, a battery disposed within a compartment within the housing, a circuit disposed within the housing, a first locking feature disposed within the housing and an access lid. In this embodiment, the aforementioned housing is fashioned, utilized, and installed in the same manner.

The circuit comprises a GPS receiver configured to receive a first signal. The circuit also comprises a cellular transmitter which is configured to transmit a second signal to a personal electronic device when said circuit receives said first signal. The second signal comprises GPS and map coordinate information regarding location of the device. The housing further comprises a power switch in electrical communication with the circuit and the battery. The device may also be configured to only be activated by insertion of the battery and only deactivated by removal of the battery.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
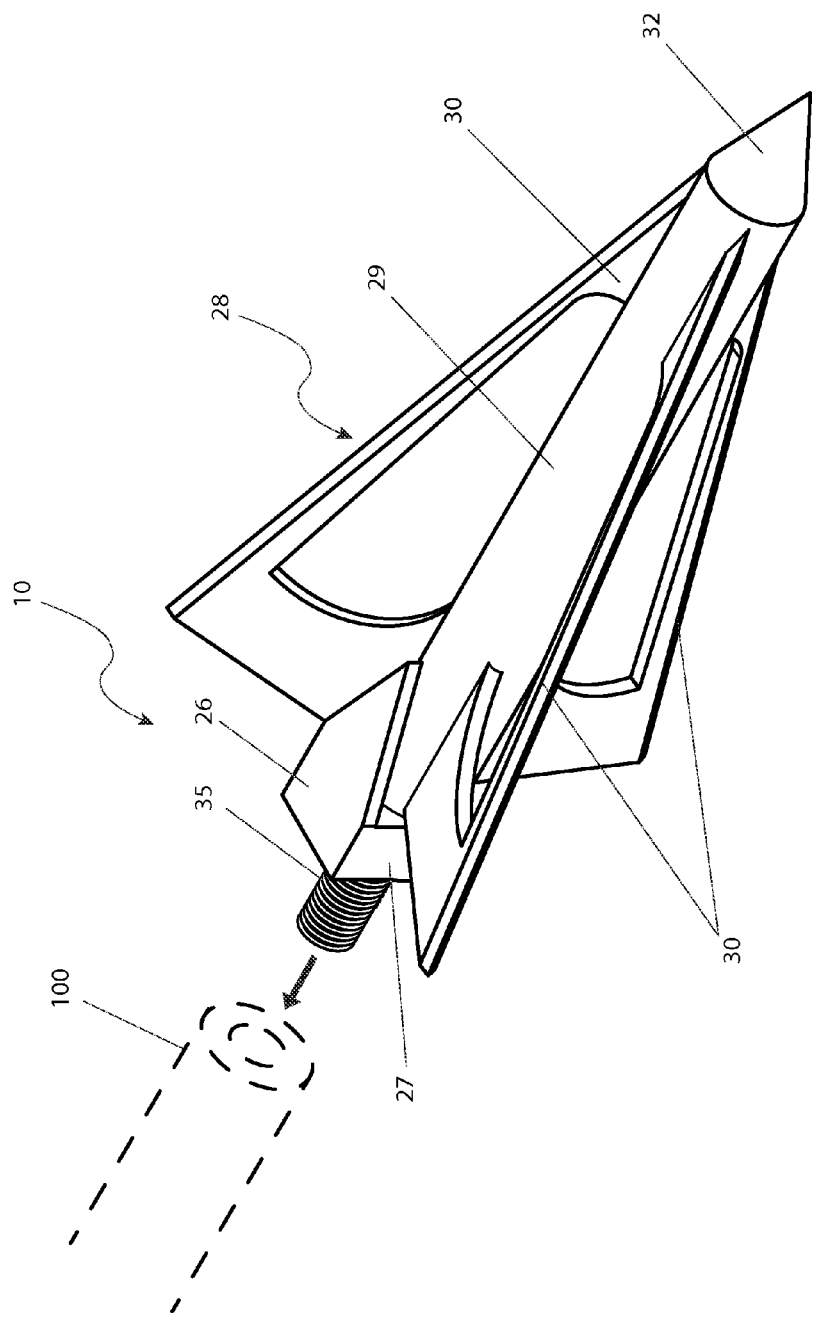
FIG. 1 is a perspective view of an arrow head tracking device 10, according to a preferred embodiment of the present invention.

DESCRIPTIVE KEY 10 arrow head tracking device
20 circuit
23 battery
24 battery compartment
25 housing
26 access lid
27 mounting aperture
28 arrow head
29 ferrule
30 broadhead blade
32 broadhead tip
35 threaded adapter
37a male locking feature
37b female locking feature
100 arrow shaft
110 first signal
120 second signal
130 personal electronic device

DETAILED DESCRIPTION OF THE PREFERRED EMBODIMENT

Figure 2:
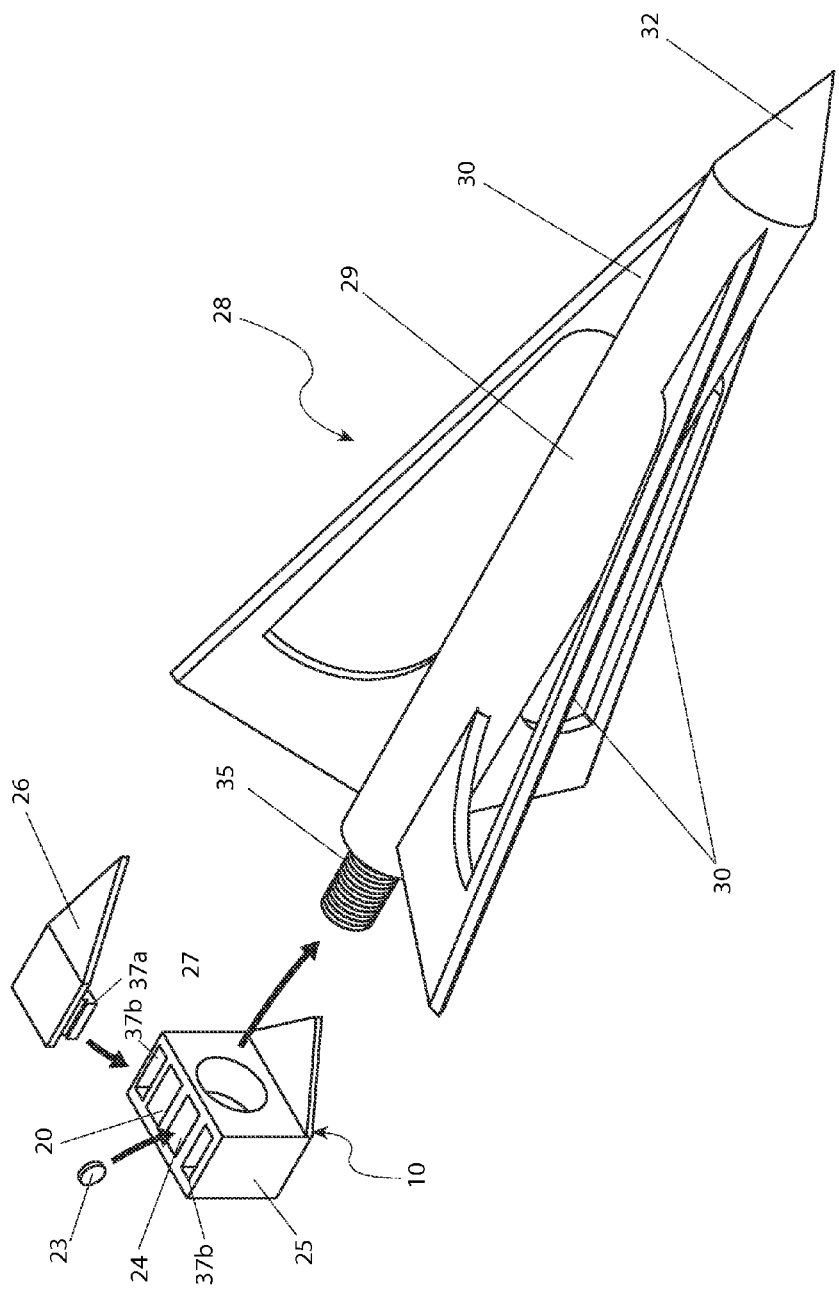
FIG. 2 is an exploded view of the arrow head tracking device 10, according to a preferred embodiment of the present invention; and, FIG. 3 is an electrical block diagram of the arrow head tracking device 10, according to a preferred embodiment of the present invention.
Figure 3:
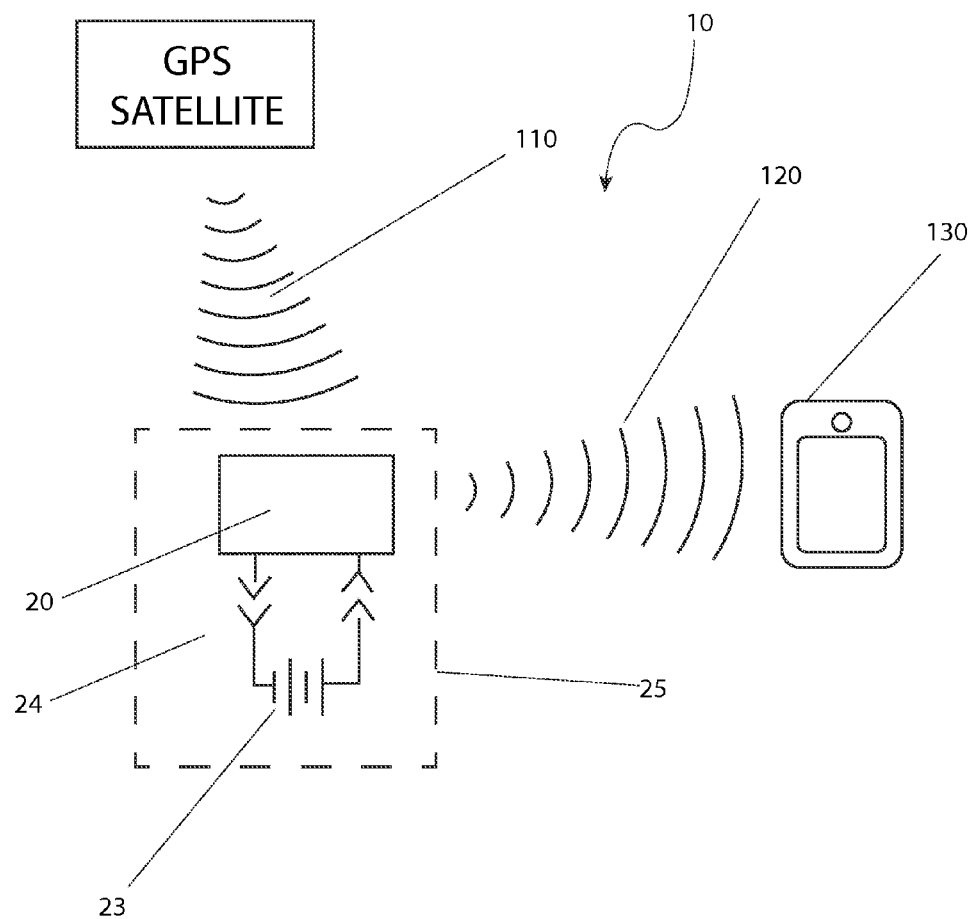

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an arrow head tracking device (herein described as the "device") 10, which provides a specially equipped arrow head 28 being threadingly installed upon a conventional arrow shaft 100. The device 10 includes circuitry 20 which provides a global positioning system (GPS) receiver and a cellular transmitter, both powered by an on-board miniature battery 23 being similar to those in hearing aids. The device 10 allows a hunter to quickly locate an arrow shaft 100 having the device 10 using a personal electronic device 130 such as a cellular telephone, containing a specialized software application.

Referring now to FIGS. 1 and 2, perspective and exploded views of the device 10, according to the preferred embodiment of the present invention, are disclosed. The device 10 includes a generally rectangular plastic housing 25 having aerodynamically shaped features disposed longitudinally along the center portion of the arrow head 30. The housing 25 contains the aforementioned circuit 20 and battery 23 portions. The device 10 is shown here being attached to a broad arrow-type arrow head 28 having conventional integral portions such as a central ferrule 29, a plurality of broadhead blades 30, a pointed broadhead tip 32, and a threaded adapter 35 for attachment to an arrow shaft 100. Although the device 10 is illustrated here being used with a broad head-type arrow head 28, it is understood that the device 10 could be adapted to all types of arrowheads, and as such should not be interpreted as a limiting factor of the invention 10.

The housing 25 further provides a snap-in-type access lid 26 which enables easy access to an internal battery compartment 24, thereby allowing convenient replacement of the battery 23. The access lid 26 is envisioned to include integrally-molded male locking features 37a which attach to corresponding female locking feature portions 37b molded into the housing 25, to secure the battery 23 within. It is also envisioned that other locking features may be employed. The housing 25 also provides a mounting aperture 27 with a circular cross-section, being sized so as to enable sliding insertion of a threaded adapter portion 35 of the arrow head 28 through the device 10. Subsequently, as the arrow shaft 100 and arrow head 28 are threadingly attached to each other, the housing 25 is entrapped and secured in position between the arrow head 28 and the arrow shaft 100.

It is envisioned that the device 10 would be electronically activated upon installation of the battery 23; however, it is understood that other means of activation and deactivation of the device 10 may be utilized to conserve battery life such as incorporating a miniature on/off switch, or by activating and deactivating the device 10 using the personal electronic device 130, and as such should not be interpreted as a limiting factor of the device 10.

Referring now to FIG. 3, an electrical block diagram of the device 10, according to a preferred embodiment of the present invention, is disclosed. During the tracking of game, having been shot with the arrow shaft 100 containing the arrow head 28 and the device 10, a GPS receiver portion of the circuit 20 receives and processes data from GPS satellites, and the cellular transmitter portion of the circuit 20 then communicates calculated coordinates of the device 10 to the personal electronic device 130 in the user's possession, together with GPS and mapping software also contained within the personal electronic device 130, the user is guided to the device 10 and the game via directions which are displayed upon the screen of the personal electronic device 130.

The device 10 is envisioned to be equally effective in tracking stricken game or for just looking for a lost arrow equipped with the device 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of configuring and utilizing the device 10 may be achieved by performing the following steps: procuring the device 10; fastening the housing 20 to the arrow head 28 by inserting the threaded adapter portion 35 of the arrow head 28 through the mounting aperture portion 27 of the housing 25; entrapping the device 10 by threading the threaded adapter 35 into an end portion of the arrow shaft 100; downloading a specific software application into an existing personal electronic device 130 such as a cellular telephone, if not previously installed; installing a fresh battery 23 into the housing to electronically activate the device 10 by removing the access lid 26; inserting the battery 23 into the battery compartment 24; replacing the access lid 26; proceeding to a hunting area while carrying the arrow shaft 100 equipped with the device 10 and the personal electronic device 130; shooting the arrow shaft 100 at game in a normal manner using a bow; tracking the game as needed by utilizing a first signal 110 as it is transmitted by GPS satellites and received by the circuit portion 20 of the device 10; allowing the device 10 to process the received data and intermittently transmit resultant coordinate data to the personal electronic device 130 via a second signal 120; following directions being displayed on a screen portion of the personal electronic device 130 until finding the game; and, benefiting from recovering the arrow shaft 100, the arrow head 28, the device 10, and the game, afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A tracking device, comprising;
a housing having a generally "c"-shaped configuration, further having barbed points located at distal ends of a pair of horizontal extensions;
an aperture located at a center point of a vertical portion linking said pair of horizontal members;

a battery disposed within a compartment within said housing;

a circuit disposed within said housing;

a first locking feature disposed within said housing; and, an access lid having a second locking feature disposed on an underside thereof;

wherein said second locking feature matingly interacts with said first locking feature thereby removably attaching said access lid to said housing;

wherein said battery is in electrical communication with said circuit;

wherein said housing is configured to be removably attached, via said aperture, to an arrow bolt between said arrow bolt and an arrow head.

2. The device of claim 1, wherein said circuit comprises a GPS receiver configured to receive a first signal.

3. The device of claim 2, wherein said circuit further comprises a transmitter configured to transmit a second signal to a remote location when said circuit receives said first signal.

4. The device of claim 3, wherein said second signal comprises GPS and map coordinate information regarding location of said device.

5. The device of claim 1, wherein said housing further comprises a power switch in electrical communication with said circuit and said battery.

6. The device of claim 1, wherein said device is only activated by insertion of said battery and only deactivated by removal of said battery.

7. A tracking device, comprising;

an arrow head; further comprising:
    a plurality of blades;
    a ferrule;
    a tip; and,
    a threaded adapter;

a housing having a generally "c"-shaped configuration, further comprising:
    barbed points located at distal ends of a pair of horizontal extensions;
    an aperture located at a center point of a vertical portion linking said pair of horizontal members;

a battery disposed within a compartment within said housing;

a circuit disposed within said housing;

a first locking feature disposed within said housing; and, an access lid, having a second locking feature disposed on an underside thereof;

wherein said battery is in electrical communication with said circuit;

wherein said second locking feature matingly interacts with said first locking feature thereby removably attaching said access lid to said housing;

wherein said housing is configured to be removably attached, via said aperture, to an arrow bolt between said arrow bolt and said arrow head; and, wherein said arrow head is further configured to interlock with said housing.

8. The device of claim 7, wherein said circuit comprises a GPS receiver configured to receive a first signal.

9. The device of claim 8, wherein said circuit further comprises a transmitter configured to transmit a second signal to a remote location when said circuit receives said first signal.

10. The device of claim 9, wherein said second signal comprises GPS and map coordinate information regarding location of said device.

11. The device of claim 7, wherein said housing further comprises a power switch in electrical communication with said circuit and said battery.

12. The device of claim 7, wherein said device is only activated by insertion of said battery and only deactivated by removal of said battery.

\* \* \* \* \*